United States Patent [19]
Schwinn et al.

[11] Patent Number: 5,574,437
[45] Date of Patent: Nov. 12, 1996

[54] SAFETY DEVICE FOR A PRINTING MACHINE

[75] Inventors: Klaus Schwinn; Bernd Lindner, both of Heusenstamm; Reinhold Bischof, Dietzenbach; Heinz Gotz, Alzenau; Joachim Deschamps, Neuberg, all of Germany

[73] Assignee: MAN Roland Druckmaschinen AG, Germany

[21] Appl. No.: 456,082

[22] Filed: May 31, 1995

[30] Foreign Application Priority Data

May 31, 1994 [DE] Germany ............ 44 18 998.2

[51] Int. Cl.⁶ .................................. G08B 21/00
[52] U.S. Cl. ............ 340/679; 340/522; 340/507; 340/540; 318/103; 192/129 A; 49/31
[58] Field of Search .................... 340/679, 540, 340/522, 507; 74/2–3.56; 381/56; 318/103; 192/129 A; 49/31

[56] References Cited

U.S. PATENT DOCUMENTS

| | | | |
|---|---|---|---|
| 4,266,221 | 5/1981 | Hawkins | 340/679 |
| 4,821,024 | 4/1989 | Bayha | 340/540 |
| 5,165,107 | 11/1992 | Hand et al. | 340/679 |
| 5,189,388 | 2/1993 | Mosley et al. | 340/679 |
| 5,264,834 | 11/1993 | Silken et al. | 340/679 |

FOREIGN PATENT DOCUMENTS

2754040A1 6/1979 Germany.
2919087A1 11/1990 Germany.

OTHER PUBLICATIONS

CEIG–Berichte, Juli/Sep. 1957, pp. 179–185, "Meldeeinrightungen fur Schaltwaren", von Herbert Schmitz, Voight & Haeffner AG.

*Primary Examiner*—John K. Peng
*Assistant Examiner*—Benjamin C. Lee
*Attorney, Agent, or Firm*—Leydig, Voit & Mayer, Ltd.

[57] ABSTRACT

This invention describes a monitoring device which monitors the safety of a printing machine. The printing machine has a drive, a control unit arranged upstream of the drive, command buttons which are connected to the control unit and via which the start-up of the printing machine can be initiated, as well as sound generators, connected to the control unit, for the emission of an acoustic alarm signal after the actuation of one of the command buttons initiating the start-up. The monitoring device ensures that a start-up of the printing machine is only carried out if an acoustic alarm signal has previously been properly emitted. This is achieved, according to the invention, by the monitoring device registering the emission of the acoustic alarm signal and, in the event of the alarm signal not being emitted, inhibits the drive of the printing machine from starting up. The monitoring device inhibits the drive via the control unit, disabling the main contactor connected to the drive, applying the brake or switching off the field current via a field contactor.

14 Claims, 6 Drawing Sheets

SAFETY DEVICE FOR A PRINTING MACHINE

FIELD OF THE INVENTION

The present invention relates to the operation of a printing machine, and more particularly to a safety device for the printing machine.

BACKGROUND OF THE INVENTION

In printing machines and especially sheet-fed offset printing machines, safety regulations often require the printing machine to emit an acoustic alarm signal before the start-up of the printing machine. After the operator of the printing machine enters the specific start-up command (such as inching, creep speed, speeding up to basic or production rotational speed, etc.) via a command button, the printing machine sounds an alarm tone for a specified period of time (e.g. three seconds). After the emission of this alarm tone, the operator must re-enter the specific start-up command within a specified period of time (e.g. ten seconds). Only after the operator enters the two commands in sequence does the control unit of the printing machine start-up the drive. An acoustic start-up alarm device for printing and paper processing machines is described in DIN 8738, November 1990.

In the prior art, start-up alarm devices could possibly fail to emit the alarm signal prior to the start-up of the printing machine. Defects in the signal transmitters or in the drive electronics connected upstream to the start-up alarm device could cause the start-up alarm device to malfunction. This represents a danger to personnel in that those in proximity to the printing machine have no audio warning prior to start-up of the printing. In particular, certain printing machine operations, such as an inching operation which drive the machine with open guards, necessitate the sounding of an alarm before the start of operation.

SUMMARY OF THE INVENTION

Accordingly, a general object of the present invention is to increase the safety of the printing machines.

Another general object of the present invention is to provide a device for preventing the operation of the printing machine if the alarm has not sounded.

An additional object of the present invention is to stop the printing machine if the printing machine is operating before the alarm is sounded.

The foregoing and other objects are, in the present invention, embodied in an improved start-up device for a printing machine. This apparatus is different from prior devices in that it monitors and ensures the sounding of the alarm. In accordance with one aspect of the present invention, the start-up device has a monitoring device which registers the emission of the acoustic alarm signal of one or more sound generators fitted on the printing machine. The monitoring device is connected to the control unit and/or to the drive of the printing machine in such a manner that the monitoring device prevents the printing machine from starting up in the event of that the sound generators do not emit an acoustic alarm signal. The monitoring device can disable operation by cutting off the power converter of the drive from the mains via a main contactor or by switching off the field current via a field contactor. Thus, the present invention discloses an apparatus which can ensure the sounding of an alarm prior to operation of the printing machine.

In accordance with another aspect of the present invention, the monitoring device can monitor the drive with respect to its state of motion. The monitoring device can then determine whether the printing machine is carrying out a movement through information generated from the tachometer generator. After entry of a start-up command, if the monitoring device determines that the rotational speed of the drive deviates from zero, even though no acoustic alarm signal was emitted, the drive is then stopped immediately through, among other things, an electrically actuable brake.

To detect the emission of the acoustic alarm signal, according to a simple embodiment of the invention, a microphone can be place in proximity to at least one sound generator, such as a horn or a piezoelectric signal generator. The microphone is then is connected to the monitoring device. In normal operation, the monitoring device receives an electrical signal in the form of an alternating voltage if the sound generator emits an acoustic alarm signal.

Still another aspect of the present invention is to connect the input of at least one sound generator to the monitoring device. The monitoring device can thus determine directly, rather than through using a microphone, whether the sound generator is being driven with a voltage provided for the emission of the acoustic alarm signal.

A particularly advantageous configuration of the invention occurs if at least one of the sound generators is composed of a piezoelectric signal transmitter. In certain piezoelectric transmitters, only a third electrode needs to be fitted so that in the case of the proper oscillation of the piezoceramic material, because of the mechanical stress condition, a corresponding electrical voltage can be extracted. Use is made here of the fact that the piezoelectric effect is a reversible process.

Other objects and advantages will become apparent from the following detailed description when taken in conjunction with attached drawings. Moreover, while the invention will be described in connection with certain preferred embodiments, it is not intended that the invention be limited to those specific embodiments but rather that it be accorded a broad scope commensurate with the appended claims, consistent with the prior art.

DETAILED DESCRIPTION OF THE PREFERRED EMBODIMENT

Figure 1:
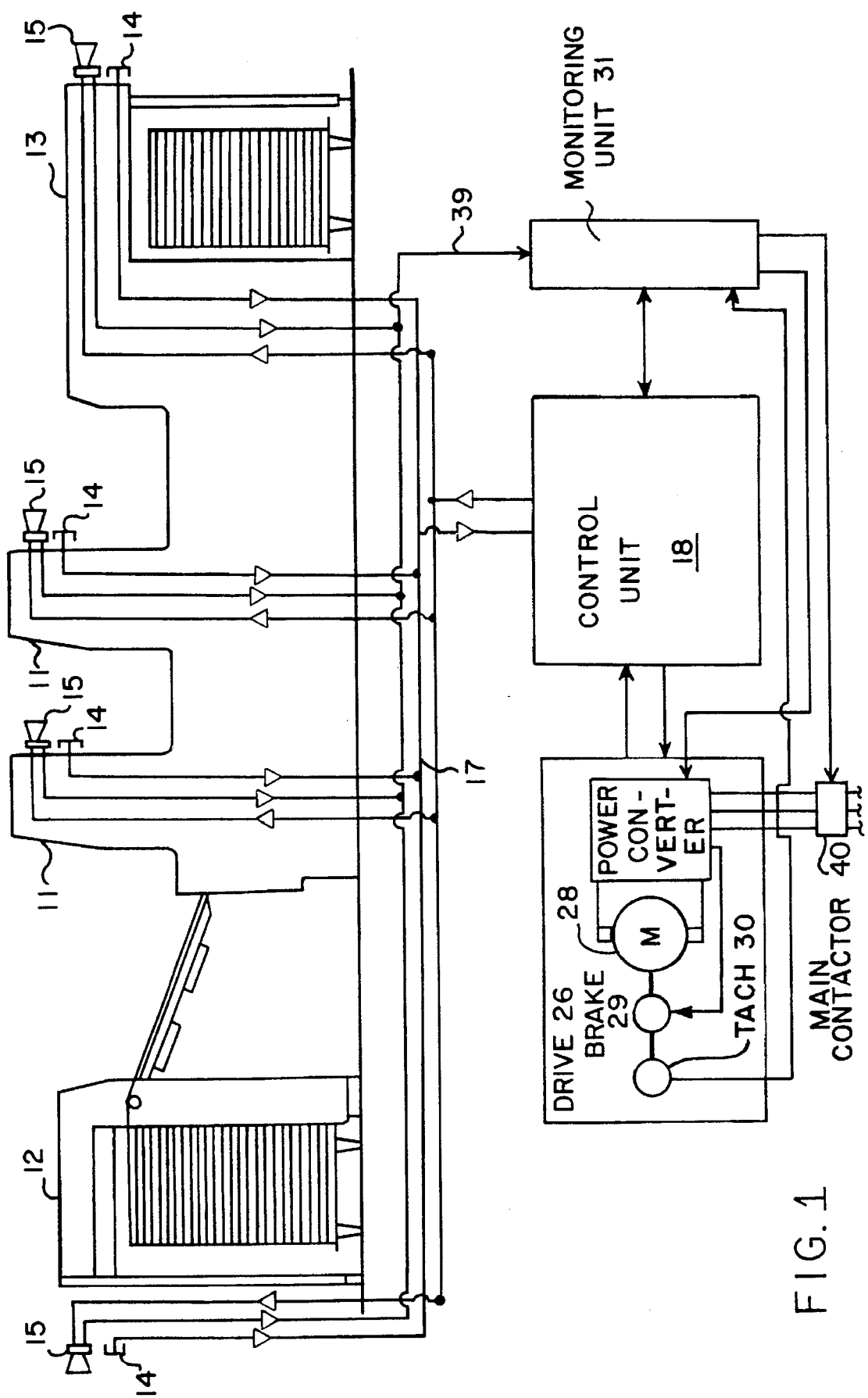
FIG. 1 is a layout of the safety device in combination with the printing machine.
Figure 2:
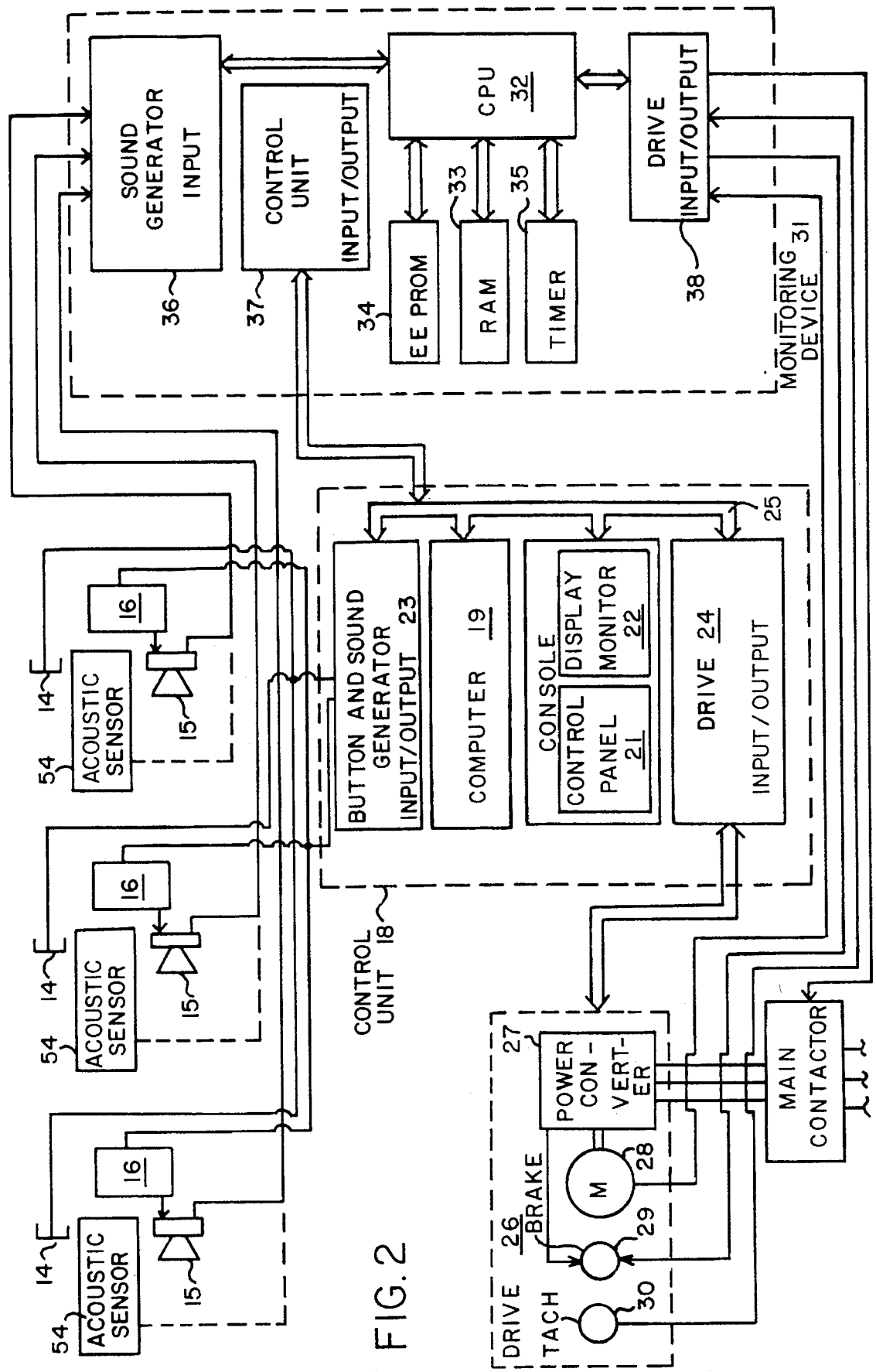
FIG. 2 is a block diagram of the safety device in FIG. 1.

FIG. 1 shows, in principle, a sheet-fed offset printing machine 10 having two printing units 11, a feeder 12 and a deliverer 13. FIG. 2 shows a detailed block diagram of the layout in FIG. 1. On the printing units 11, the feeder 12, and the deliverer 13, there are operating buttons 14 which enter start-up commands for the printing machine 10. Start-up commands represent those commands which effect a running-up of the printing machine 10 from a standstill. For example, the running-up of the machine 10 to production can include rotational speed, creep speed, or inching operation.

FIGS. 1 and 2 show only one operating button 14 on each unit in each case; however, additional input devices such as a switch, a keypad, or a computer may be placed at each unit. The operating buttons 14 are coupled via a bus system 17 to a control unit 18 of the printing machine 10. As shown in FIG. 2, the control unit 18 is composed of a computer 19, an input unit 20 such as a console with a display monitor 21 and a control panel 22, input/output controls such as the button and sound generator input/output 23 and the drive input/output 24, and a bus line 25.

The control unit 18 is operationally connected to the drive 26 of the printing machine 10 via the drive input/output 24, the drive 26 having an externally excited DC motor 28 with a line-commutated power converter 27, a tachometer generator 30 and an electromagnetically actuable brake 29.

The control unit 18 of the printing machine 10 is operationally connected, via the button and sound generator input/output 23, to sound generators 15. According to FIGS. 1 and 2, each field of operating buttons 14 is allocated a sound generator 15. However, the printing machine 10 can also have a central sound generator. A signal generator 16, as shown in FIG. 2, is connected between the control unit 18 and the sound generators 15.

The interaction of the control unit 18 with the drive 26, the operating buttons 14, and the sound generators 15 is in this case such that, following entry of a start command via an operating button 14, an acoustic alarm signal is first emitted via all the sound generators 15. After entry of the command, the command must be entered once more via the operating button 14. This has to be done within the so-called release time. If this is the case, the control unit 18 effects the starting up of the printing machine 10 via the drive 26.

As shown in FIG. 2, the monitoring device 31 is composed of a central processing unit (CPU) 32, a temporary storage device such as random access memory (RAM) 33, a permanent storage device such as an electrically erasable programmable read only memory (EEPROM) 34, a timer 35, and input/output controls such as the sound generator input 36, control unit input/output 37, and the drive input/output 38. FIGS. 1 and 2 both show that all the sound generators 15 are connected to a monitoring device 31 over a further line system 39 which is connected to the sound generator input 36. By means of this line system 39, the monitoring device 31 determines whether the emission of an acoustic alarm signal is being carried out.

In this arrangement, each sound generator 15 can be allocated an acoustic sensor 54, such as a microphone. This alternative embodiment is shown in dashed lines in FIG. 2. The acoustic sensor 54 senses the output of the speaker 15 so that, in the event that the speaker 15 malfunctions, the acoustic sensor 54 will indicate to the monitoring device 31 that the speaker 15 has not emitted a sound. In this arrangement, the acoustic sensor 54 may sense ambient noises. In order to minimize this effect, the sound generator input 36 can perform a narrow-band filtering function in combination with a threshold detector.

As an alternative thereto, the inputs to the sound generators 15 can be connected via this line system 39 to the monitoring device 31. Thus, the monitoring device 31 can determine whether the sound generators 15 are being correspondingly driven for the emission of an acoustic alarm signal.

Figure 3:
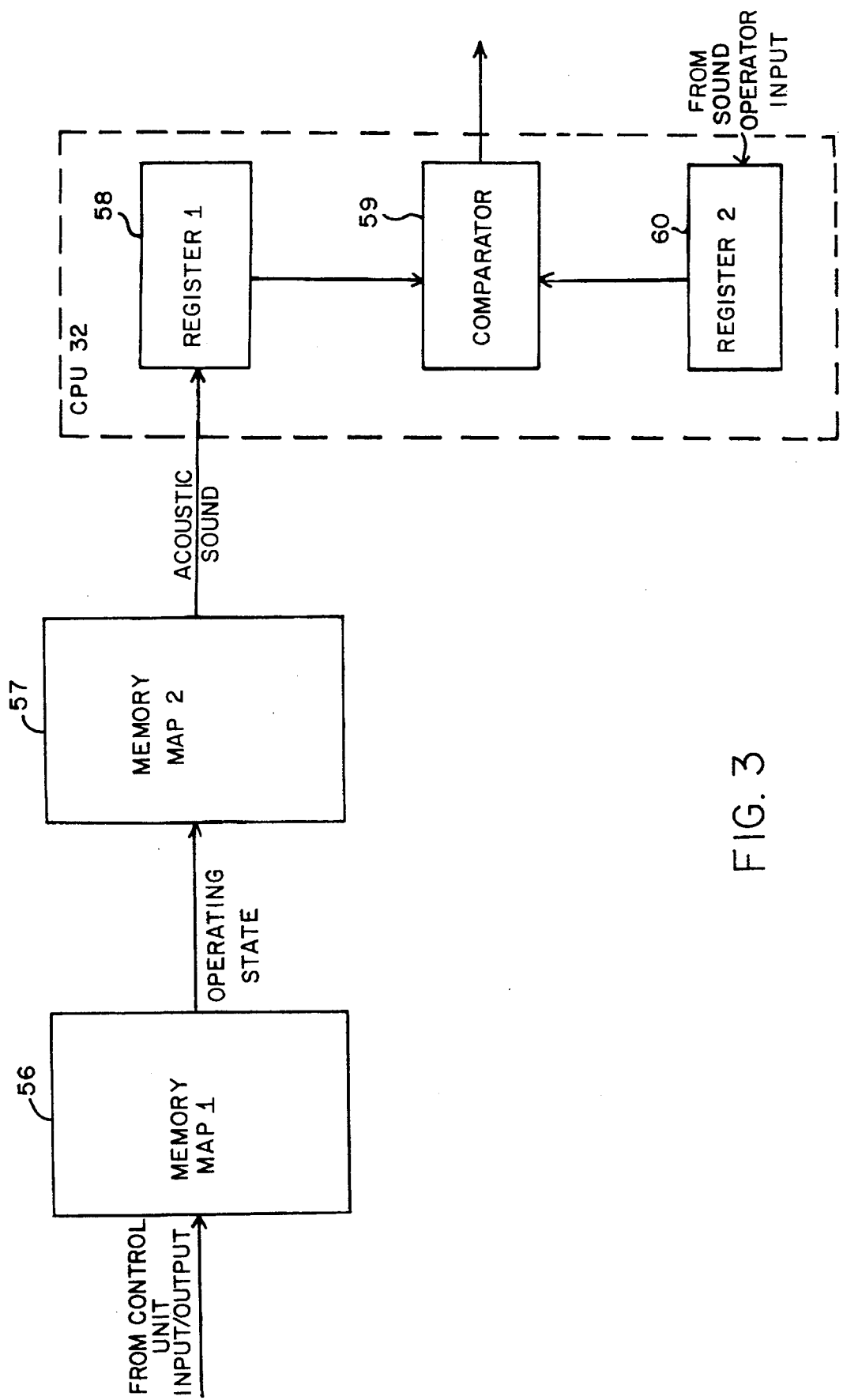
FIG. 3 is a block diagram of the memory and central processing unit.
Figure 5:
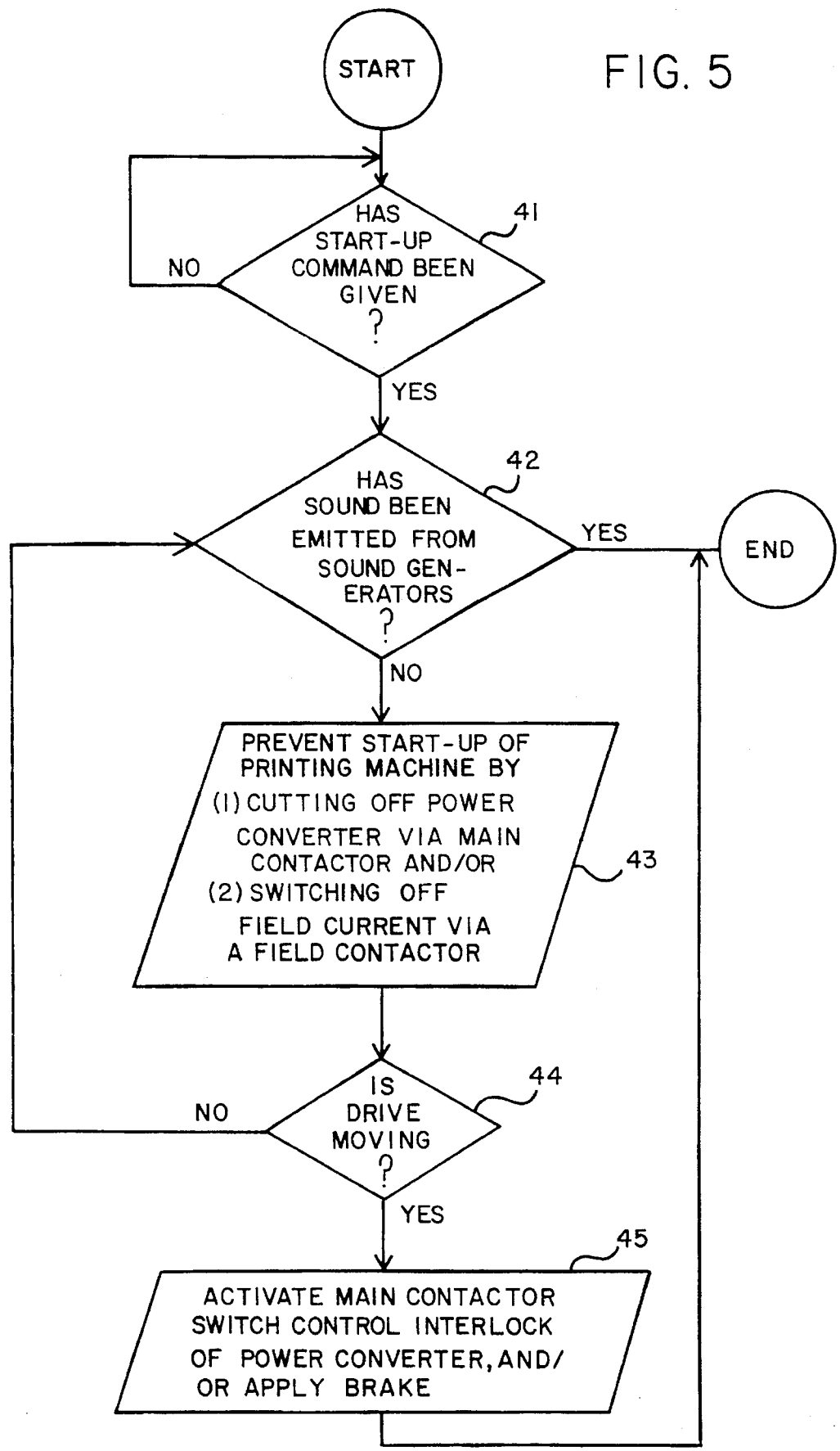
FIG. 5 is a flow diagram of the programming of the monitoring device.

As shown in FIGS. 3 and 5, the monitoring device 31 checks to see if the operator has given a start-up command 41. If a command has been entered via the buttons 14, the monitoring device 31 then determines whether the sound generators 15 emitted an acoustic alarm signal 42 via the sound generator input 36. The monitoring device 31 performs this via memory map1 56. Memory map1 56 acts as a look-up table whereby the inputs from the control unit input/output 37 access the memory location which contains the operating state of the printing machine 10 associated with the inputs. Memory map2 57 accepts the operating state as an input and also acts as a look-up table. The operating state accesses the memory location which contains the acoustic sound. The acoustic sound is then sent to register1 58. The sound from the sound generator input is sent to register2 60.

The CPU 32 then compares the two numbers in register1 58 and register2 60 via a comparator 59. If the comparator 59 determines that the actual sound equals the emitted sound (i.e. the acoustic alarm has sounded), the monitoring device 31 ends monitoring of the start-up of the printing machine 10 and the corresponding driving of the drive 26 is carried out via the control unit 18 after the repeated command entry.

If the monitoring device 31 does not detect an acoustic alarm signal, the monitoring device 31 can prevent a start-up of the printing machine 10, for example, through the control unit 18 via a corresponding signal emission from the drive input/output 24. The monitoring device 31 in this case is preferably connected directly to the main contactor 40 or to a field contactor (not shown) of the drive 26 or of the line-commutated power converter 27. In the case of the non-emission of a proper alarm signal, the drive 26 is cut off 43 and switched current-free via a main contactor 40 and/or via a field contactor.

Figure 4:
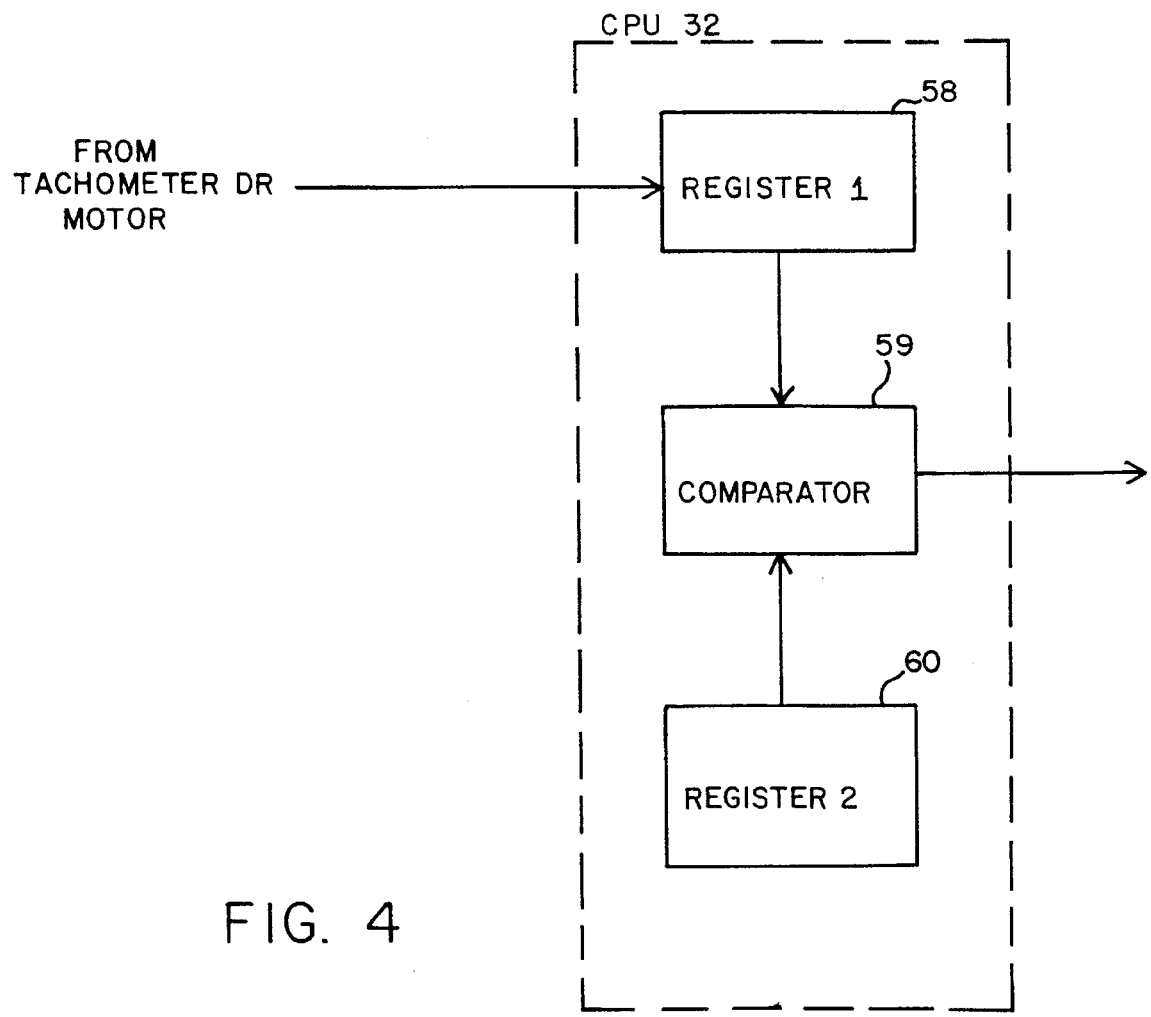
FIG. 4 is a block diagram of the central processing unit.

The monitoring device 31 then determines whether the drive is in motion 44. As shown in FIG. 4, the monitoring device 31 registers the state of motion of the drive 26, for example, by picking off the signal of the tachometer generator 30 or as an alternative thereto, the picking off of the armature voltage of the DC motor 28. This value is then sent to register1 58. A value of zero is placed in register2 60. If the output of the comparator 59 indicates that the values of register1 58 and register2 60 are not equal, the drive 26 is in motion. If the monitoring device 31 determines a start-up of the drive 26, even though the acoustic alarm signal has not been emitted, stopping of the printing machine 10 is carried out here via the drive 26. This stopping 45 can also be carried out by means of actuation of the main contactor 40, a field contactor, or by switching the control interlock of the power converter 27. Additionally, the brake 29 can be applied.

Figure 6:
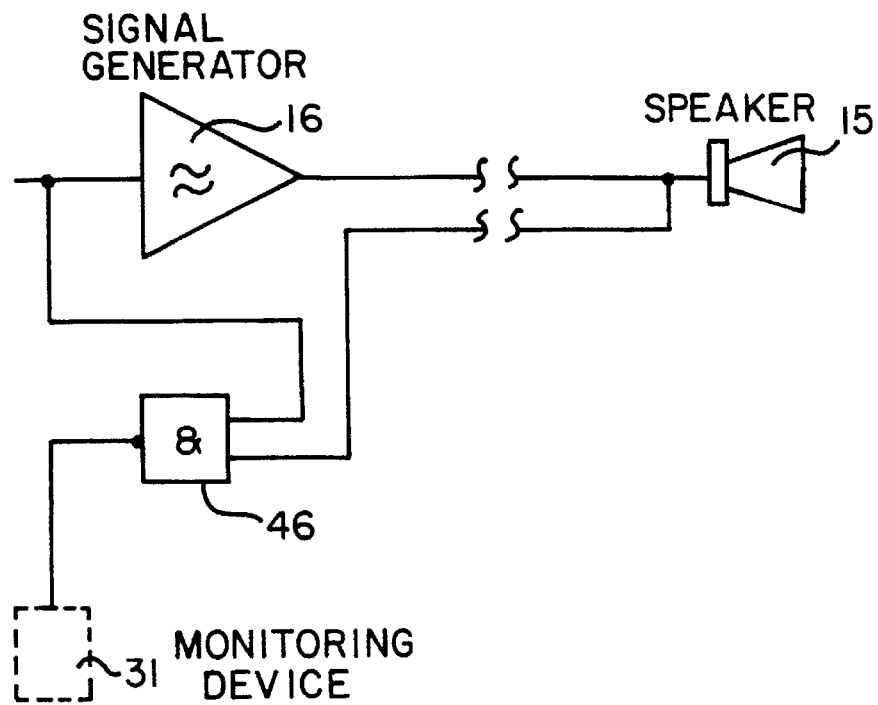
FIG. 6 is a circuit for monitoring the proper driving of the sound generator in FIG. 1.

FIG. 6 shows a simple configuration of the invention for monitoring the sound generators 15 shown in FIG. 1. This arrangement determines whether the sound generator or generators 15 are being properly driven for the emission of the acoustic alarm signal by the signal generator 16. The inputs of an AND-element 46 are connected to the input signal and also to the output signal of the signal generator 16, so that in the case of the proper operation of the signal generator 16, a corresponding signal can be fed to the monitoring device 31 at the output of the AND-element 46. The signal generator 16 is configured such that an alternating voltage corresponding to the operation of the sound generators 15 is provided at its output if a signal is present on its input. The direct pick-off, shown in FIG. 6, of the output signal of the signal generator 16 is in this case only made in principle, since provision is preferably made to pick off the signal fed from the signal generator 16 to the sound generator 15 directly on the sound generator 15 and to feed it back accordingly via a line system.

Figure 7:
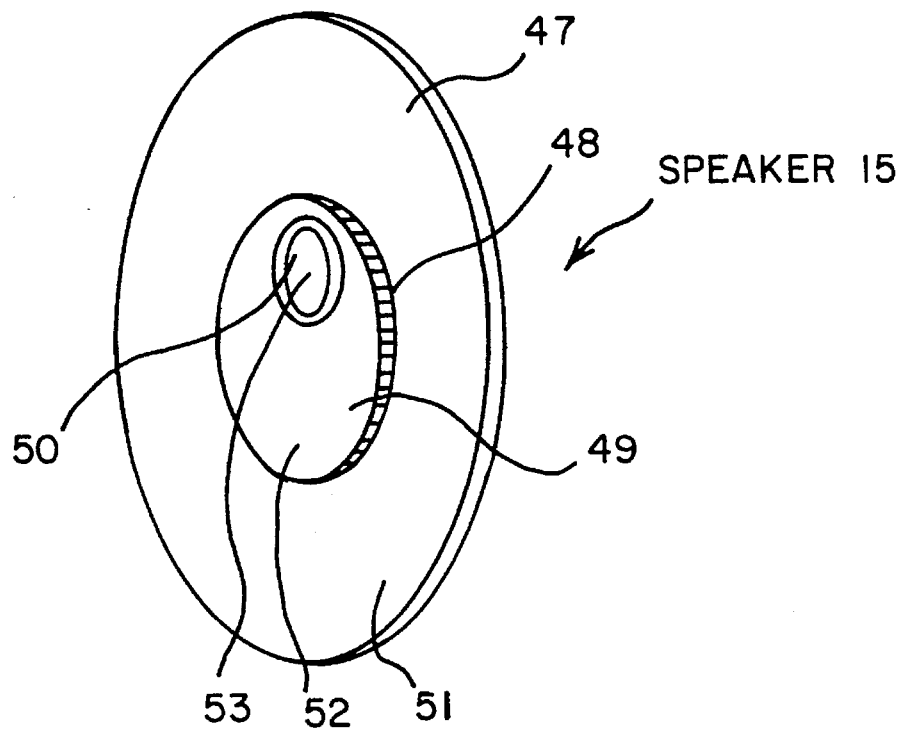
FIG. 7 is a piezoelectric signal transmitter with additional interrogation electrodes.

FIG. 7 shows a preferred configuration of the invention, in which the sound generators 15 are constructed as a piezoelectric signal transmitter. The piezoelectric sound generator 15 shown consists of a metal diaphragm 47 and of a platelet 48 of piezoceramic material applied thereto in the form of a thin layer. An electrode 49 is fitted on that side of the platelet 48 facing away from the metal diaphragm 47, in the form of a metallic coating.

The metal diaphragms 47 and the electrode 49 are connected to two wires 51, 52. If an alternating voltage is now applied, via the line 51, 52, to both sides of the piezoceramic platelet 48, the platelet 48 and the metal diaphragm 47 are set into mechanical vibrations in a manner known per se, the metal diaphragm 47 acting as a sound-emitting surface (loudspeaker diaphragm).

Fitted on that side of the piezoceramic platelet 48 facing away from the metal diaphragm 47 and electrically insulated with respect to the electrode 49, is a further electrode 50, which is connected to a further line 53. This additional electrode 50 is produced in this arrangement by means of a circular scratching (interruption) of the metallic layer of the electrode 49. Now, during the operation of this sound generator 15, there is an alternating voltage between the lines 51 and 52. An alternating voltage can likewise be picked off with respect to the metal diaphragm 47, via the line 53. This alternating voltage can be fed to the monitoring device 31, via the line 53, for determining the emission of the alarm signal.

What is claimed is:

1. A monitoring device for controlling the operation of a printing machine, the printing machine having a drive, the printing machine also having a control unit connected to buttons via which the start-up of the printing machine through the drive can be initiated, the control unit also connected to at least one sound generator for emission of an acoustic alarm after actuation of one of the buttons, the monitoring device comprising: a sound generator input for receiving a signal from the at least one sound generator; a means for receiving input for the operating state of the printing machine; a processor having a comparator, the processor connected to the sound generator input and connected to the means for receiving input for the operating state, the processor determining the operation of the printing machine based on the means for receiving input for the operating state and the comparator determining whether an acoustic alarm was generated from the at least one sound generator; a means for activating the stopping of the drive connected to the processor when the comparator determines that no acoustic alarm was generated by the at least one sound generator upon start-up of the printing machine.

2. The monitoring device as defined in claim 1 wherein a microphone is connected to the sound generator input, the microphone generating the signal from the at least one sound generator.

3. The monitoring device as defined in claim 1 wherein the at least one sound generator is a piezoelectric signal transmitter.

4. The monitoring device as defined in claim 1 wherein the printing machine further comprises a main contactor, and wherein the drive further comprises a power converter, the main contactor connected to the power converter, the main contactor also connected to the means for activating the stopping of the drive, whereby the means for activating the stopping of the drive shuts the power to the power converter via the main contactor.

5. The monitoring device as defined in claim 1 wherein the drive further comprises a brake and wherein the means for activating the stopping of the drive is connected to the brake, the means for activating the stopping of the drive activating the brake.

6. The monitoring device as defined in claim 1 wherein the means for receiving input for the operating state of the printing machine comprises a connection to the control unit.

7. The monitoring device as defined in claim 1 wherein a signal generator which is connected to the at least one sound generator is also connected to the sound generator input.

8. The monitoring device as defined in claim 7 wherein an output of an AND gate is connected to the sound generator input, one input of the AND gate connected to an input of the signal generator and the other input connected to an output of the signal generator.

9. The monitoring device as defined in claim 1 wherein the means for activating the stopping of the drive is connected to the control unit.

10. The monitoring device as defined in claim 9 wherein the drive further comprises a power converter and wherein the control unit is connected to the power converter, the means for activating the stopping of the drive cutting off power to the power converter via the control unit.

11. The monitoring device as defined in claim 1 wherein the drive further comprises a tachometer and wherein the means for receiving input for the operating state of the printing machine is connected to the tachometer.

12. The monitoring device as defined in claim 11 wherein the comparator compares the value from the tachometer, the monitoring device using the means for activating the stopping of the drive when the tachometer is greater than zero and the acoustic alarm has not been sounded.

13. The monitoring device as defined in claim 1 wherein the drive further comprises a motor and wherein the means for receiving input for the operating state of the printing machine is connected to the motor.

14. The monitoring device as defined in claim 13 wherein the comparator compares the value from the motor, the monitoring device using the means for activating the stopping of the drive when the value of the motor is greater than zero and the acoustic alarm has not been sounded.

* * * * *